United States Patent
Schmidt et al.

(10) Patent No.: US 8,126,588 B2
(45) Date of Patent: Feb. 28, 2012

(54) METHOD AND SYSTEM FOR CONTROLLING TRANSPORT SEQUENCING IN A PROCESS TOOL BY A LOOK-AHEAD MODE

(75) Inventors: Kilian Schmidt, Dresden (DE); Matthias Becker, Burghausen (DE)

(73) Assignee: Advanced Micro Devices, Inc., Austin, TX (US)

( * ) Notice: Subject to any disclaimer, the term of this patent is extended or adjusted under 35 U.S.C. 154(b) by 834 days.

(21) Appl. No.: 12/122,075

(22) Filed: May 16, 2008

(65) Prior Publication Data

US 2009/0088895 A1   Apr. 2, 2009

(30) Foreign Application Priority Data

Sep. 29, 2007   (DE) .......................... 10 2007 046 848

(51) Int. Cl.
*G06F 7/00*   (2006.01)
*G06F 19/00*   (2011.01)

(52) U.S. Cl. ........ 700/228; 700/121; 700/213; 700/214; 700/218; 700/95; 700/100; 700/101; 700/112; 700/113; 700/108; 700/174; 700/182; 438/5

(58) Field of Classification Search ........................ None
See application file for complete search history.

(56) References Cited

U.S. PATENT DOCUMENTS

| | | | |
|---|---|---|---|
| 6,351,686 B1 * | 2/2002 | Iwasaki et al. ............... | 700/228 |
| 6,711,454 B2 * | 3/2004 | Joma et al. ................... | 700/121 |
| 7,123,980 B2 * | 10/2006 | Funk et al. .................... | 700/121 |
| 7,151,975 B2 * | 12/2006 | Chang et al. ................. | 700/108 |

* cited by examiner

*Primary Examiner* — Gene Crawford
*Assistant Examiner* — Yolanda Cumbess
(74) *Attorney, Agent, or Firm* — Williams, Morgan & Amerson

(57) ABSTRACT

By providing a look-ahead functionality for a tool internal substrate handling system of process tools on the basis of a process history, the tool internal substrate sequencing may be significantly enhanced. The look-ahead functionality enables a prediction of process time of substrates currently being processed in a respective process module, thereby enabling the initiation of transport activity for substrate load operations in order to significantly reduce the overall idle time of process modules occurring during substrate exchange.

15 Claims, 2 Drawing Sheets

METHOD AND SYSTEM FOR CONTROLLING TRANSPORT SEQUENCING IN A PROCESS TOOL BY A LOOK-AHEAD MODE

BACKGROUND OF THE INVENTION

1. Field of the Invention

Generally, the present disclosure relates to the field of fabricating microstructures, such as integrated circuits, and, more particularly, to the handling of substrates in process tools, such as cluster tools, used for the fabrication of semiconductor devices or other micro structures.

2. Description of the Related Art

Today's global market forces manufacturers of mass products to offer high quality products at a low price. It is thus important to improve yield and process efficiency to minimize production costs. This holds especially true in the field of microstructure fabrication, for instance, for manufacturing semiconductor devices, since, in this field, it is essential to combine cutting-edge technology with mass production techniques. It is, therefore, the goal of manufacturers of semiconductors, or generally of microstructures, to reduce the consumption of raw materials and consumables while at the same time improve process tool utilization. The latter aspect is especially important since, in modern semiconductor facilities, equipment is required which is extremely cost intensive and represents the dominant part of the total production costs. At the same time, the process tools of the semiconductor facility have to be replaced more frequently compared to most other technical fields due to the rapid development of new products and processes, which may also demand correspondingly adapted process tools.

Integrated circuits are typically manufactured in automated or semi-automated facilities, thereby passing through a large number of process and metrology steps to complete the device. The number and the type of process steps and metrology steps a semiconductor device has to go through depends on the specifics of the semiconductor device to be fabricated. A usual process flow for an integrated circuit may include deposition processes, such as chemical vapor deposition (CVD), physical vapor deposition (PVD) and the like, in combination with a plurality of photolithography steps to image a circuit pattern for a specific device layer into a resist layer, which is subsequently patterned to form a resist mask for further processes in structuring the device layer under consideration by, for example, etch or implant processes and the like. Thus, layer after layer, a plurality of process steps are performed based on a specific lithographic mask set for the various layers of the specified device. For instance, a sophisticated CPU requires several hundred process steps, each of which has to be carried out within specified process margins so as to fulfill the specifications for the device under consideration. As the majority of the process margins are device-specific, many of the metrology processes and the actual manufacturing processes are specifically designed for the device under consideration and require specific parameter settings at the adequate metrology and process tools.

In a semiconductor facility, a plurality of different product types are usually manufactured at the same time, such as memory chips of different design and storage capacity, CPUs of different design and operating speed and the like, wherein the number of different product types may even reach one hundred and more in production lines for manufacturing ASICs (application specific ICs). Since each of the different product types may require a specific process flow, possibly based on different mask sets for the lithography, specific settings in the various process tools, such as deposition tools, etch tools, implantation tools, chemical mechanical polishing (CMP) tools and the like, may be necessary. Consequently, a plurality of different tool parameter settings and product types may be simultaneously encountered in a manufacturing environment.

Hereinafter, the parameter setting for a specific process in a specified process tool or metrology or inspection tool may commonly be referred to as process recipe or simply as recipe. Thus, a large number of different process recipes, even for the same type of process tools, may be required which have to be applied to the process tools at the time the corresponding product types are to be processed in the respective tools. However, the sequence of process recipes performed in process and metrology tools, or in functionally combined equipment groups, as well as the recipes themselves, may have to be frequently altered due to fast product changes and highly variable processes involved. As a consequence, tool performance, especially in terms of throughput, is a very critical manufacturing parameter as it significantly affects the overall production costs of the individual devices. The progression of throughput over time of individual process and metrology tools, or even certain entities thereof, such as process modules, substrate robot handlers, load ports and the like, may, however, remain unobserved due to the complexity of the manufacturing sequences including a large number of product types and a corresponding large number of processes, which in turn are subjected to frequent recipe changes.

Recently, process tools have become more complex in that a process tool may include a plurality of functional modules or entities, referred to as cluster or cluster tool, which may operate in a parallel and/or sequential manner such that products arriving at the cluster tool may be operated therein in a plurality of process paths, depending on the process recipe and the current tool state. The cluster tool may enable the performance of a sequence of correlated processes, thereby enhancing overall efficiency by, for instance, reducing transport activities within the factory, and/or to increase tool capacity and availability by using several process chambers in parallel for the same process step. In a cluster tool, several modules or entities are typically served by one robot substrate handler, wherein the different process times, due to different recipes and the like, and/or the parallel processing in some of the modules, may result in competitive transport tasks, thereby generating a dynamic, i.e., a time-varying sequence of events. When several transport tasks are pending at a time, then the robot may operate on the basis of a predefined static rule in order to select an appropriate task for attempting to achieve a desired tool performance, such as maximum tool utilization and the like. This rule may prescribe, for example, to choose the substrate having experienced the least number of process steps from all the substrates requesting transport by the robot handler at this time, or to select the transport task having the destination with the highest predefined priority, and the like. In many cases, the transport sequencing rule is preselected, in view of tool utilization, such that the "bottleneck" module, i.e., the process module of the cluster tool having the least process capacity, is served to enable a substantially continuous operation, thereby typically producing high tool utilization as long as substrates are available at the cluster tool.

As previously explained, an important aspect of semiconductor production is the task of maintaining the throughput of each individual process chamber of a process tool at a high level, which requires that, for a given process recipe, the waiting time at the various process chambers are minimized to thereby achieve the highest possible throughput. For example, assuming that sufficient substrates are available for a continuous operation of the process tool, the entirety of substrate handling activities required for exchanging substrates at a process chamber may determine the overall idle time of the process chamber. That is, during the overall operation of the process chamber, four time periods may contribute to the overall idle time of the process chamber: (1) a time period for waiting for unloading the substrate, that is, the time period after processing of the substrate is completed and the substrate is ready for being picked up by a tool internal transport system; (2) a time period for actually unloading the substrate in which respective substrate handling activities are performed to actually remove the substrate from the respective process chamber; (3) a time period in which the process chamber is waiting for the arrival of a further substrate to be processed; and (4) a time period in which substrate handling activities are performed in order to transfer the substrate from the tool internal substrate handling system into the process chamber.

The time periods (2) and (4) are substantially determined by the characteristics of the tool internal substrate handling system, i.e., the respective robot activities are determined by the hardware capabilities of this unit. On the other hand, the time periods (1) and (3) involve transport activities for, for instance, moving the robot to the unload position of the respective process chamber, i.e., this corresponds to the time period (1), while during the time period (3), the respective robot picks up the new substrate to be loaded and moves it to the loading position of the process chamber. Thus, in view of throughput optimization, it would be advantageous to perform the transport activities required during the time periods (1) and (3) in advance, that is, prior to the end of the processing of a substrate in the process chamber under consideration. In this case, a certain type of look-ahead functionality has to be implemented in the control algorithm. For example, conventional strategies are based on a trigger event obtained from the process chamber to allow the initiation of transport activities during the time period (1), thereby enabling the positioning of the respective robot device at the unload position of the process chamber under consideration in order to immediately receive the substrate after the end of the processing. An appropriate trigger event may, for instance, be the movement of support pins used to position the substrate in the process chamber, which always occurs a few seconds prior to unloading the substrate. By employing this strategy, undue idle time of the process chamber with respect to item (1) may be significantly reduced.

With respect to reducing the waiting time according to item (3), the transport capability of the substrate handling system has to provide the ability to concurrently receive at least two substrates, for instance, in the form of a dual blade robot handler, so that a substrate may be buffered on one blade while the other blade may still be used to unload a substrate currently being processed in a respective process chamber. In order to appropriately exploit the capabilities of the substrate handling system and to provide a certain degree of look-ahead functionality for reducing the waiting time according to item (3), the correct substrate has to be buffered in the substrate handling system, wherein typically the time for picking up the substrate from a load port is significantly longer compared to the simple robot movement to position the robot handler at the unload position according to the time period (1). Consequently, the same trigger event used for reducing or avoiding the waiting time according to item (1) may not be appropriate for providing a look-ahead functionality for picking up and buffering a substrate that is to be processed next in the process chamber under consideration. Due to this fact, it is a frequently employed strategy to use a static rule to define the substrate sequencing for this buffering technique. For example, a rule may be implemented (when assuming a process tool has two process chambers one and two) that leads to the following process strategy: "always buffer substrates at number one position that will actually go to chamber two." However, in the case of such a static rule, both the timing of the buffering and the selection of the substrate to be buffered may be wrong. Consequently, the efficiency of the process tool, in particular if more than one process step is implemented therein, may significantly decrease.

Additionally, in using a static buffering strategy, the usage of non-occupied transport devices, such as a second blade of a dual blade robot handler, may be available for transport of another substrate since currently the designated process chamber may still be busy. In such a case, an alternative transport activity may be scheduled for the non-occupied transport device, however, with a high risk that the process in the designated process chamber may be finished, thereby resulting in additional idle time of the process chamber due to the non-availability of the required transport capability at the time the process is actually completed. For this reason, a respective static rule may conventionally be implemented in order to forbid an additional transfer activity with a non-occupied transport device, such as a free blade of a robot handler when the corresponding blade is designated for a certain process chamber. As a consequence, the overall throughput may significantly depend on the type and the number of static rules controlling the transport activities of a tool internal substrate handling system, while nevertheless resulting in undue idle times and reduced flexibility.

The present disclosure is directed to various methods and systems that may avoid, or at least reduce, the effects of one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the subject matter disclosed herein relates to a technique for enhancing the performance of process tools, such as cluster tools, by providing an enhanced look-ahead functionality in a control mechanism used in an automated substrate handling system for exchanging substrates between one or more load ports and one or more process modules of a process tool. As previously explained, an automatic substrate handling system may encounter a sequence of dynamic events during the processing of substrates, in particular in process tools in which the process times or certain periods thereof may not be determined by the process recipe but may depend on specific conditions within the process chamber, such as process pressure, endpoint detection and the like. In this case, process-specific events and related transport activities may occur in a highly dynamic manner, which may result in respective inefficiencies for establishing a look-ahead functionality on the basis of static rules for controlling transport activities of the tool internal substrate handling system. For example, while certain transport activities may be correlated with reliably determined process events, such as movement of substrate pins, as previously explained, appropriate and reliable trigger events may not be available for transport activities that may require a longer time period and respective decisions in view of selecting a certain substrate to be buffered in the tool internal substrate handling system may have to be made in advance of the reliable trigger event. According to the principles disclosed herein, an enhanced look-ahead functionality may be achieved by evaluating tool events that have occurred during the processing of one or more previous substrates in order to estimate the process time or any parameter related thereto for a substrate currently being processed. Consequently, based on the estimated process time, transport activities may be initiated so as to appropriately adapt the sequencing of substrates within the tool internal transport system. For example, based on the estimated process time, an appropriate substrate and a corresponding point in time may be selected in order to pick up the substrate by the tool internal transport system so that the probability for correctly selecting the substrate and the point in time for initiating the transport activities may be significantly enhanced due to the usage of information related to previous process events.

One illustrative process tool disclosed herein is configured to process substrates and comprises one or more process modules and one or more load ports configured to receive and discharge substrate carriers that contain substrates. Furthermore, the process tool comprises a substrate handling system configured to exchange substrates between the one or more load ports and the one or more process modules. Additionally, the tool comprises a process time prediction unit configured to receive tool event messages from the one or more process modules and/or the substrate handling system and to predict a current process time for the one or more process modules on the basis of one or more tool event messages received with respect to one or more previously processed substrates. Additionally, the process tool comprises a control unit operatively connected to the substrate handling system and the process time prediction unit, wherein the control unit is configured to initiate a substrate handling activity by the substrate handling system on the basis of the predicted current process time.

An illustrative transport control system disclosed herein comprises an interface configured to receive tool event messages from a controller that is operatively connected to a substrate handling system of a process tool comprising one or more process modules that are served by the substrate handling system. The transport control system further comprises a process time prediction unit operatively connected to the interface and configured to determine a start time for picking up the substrate to be supplied to the one or more process modules by the substrate handling system, wherein the determination is made on the basis of a tool event message related to a substrate previously processed in the process tool.

An illustrative method disclosed herein comprises receiving tool event messages from a process tool that is used in a manufacturing environment designed to process microstructure devices, wherein the process tool comprises one or more process modules, one or more load ports for receiving and discharging substrate carriers and a substrate handling system for exchanging substrates between the one or more load ports and the one or more process modules. The method further comprises determining a first start time for receiving a first substrate to be conveyed to the one or more process modules by the substrate handling system on the basis of a tool event message related to a substrate previously processed in the one or more process modules. Additionally, the method comprises picking up the first substrate by the substrate handling system on the basis of the first start time.

BRIEF DESCRIPTION OF THE DRAWINGS

The disclosure may be understood by reference to the following description taken in conjunction with the accompanying drawings, in which like reference numerals identify like elements, and in which.

Figure 1A:
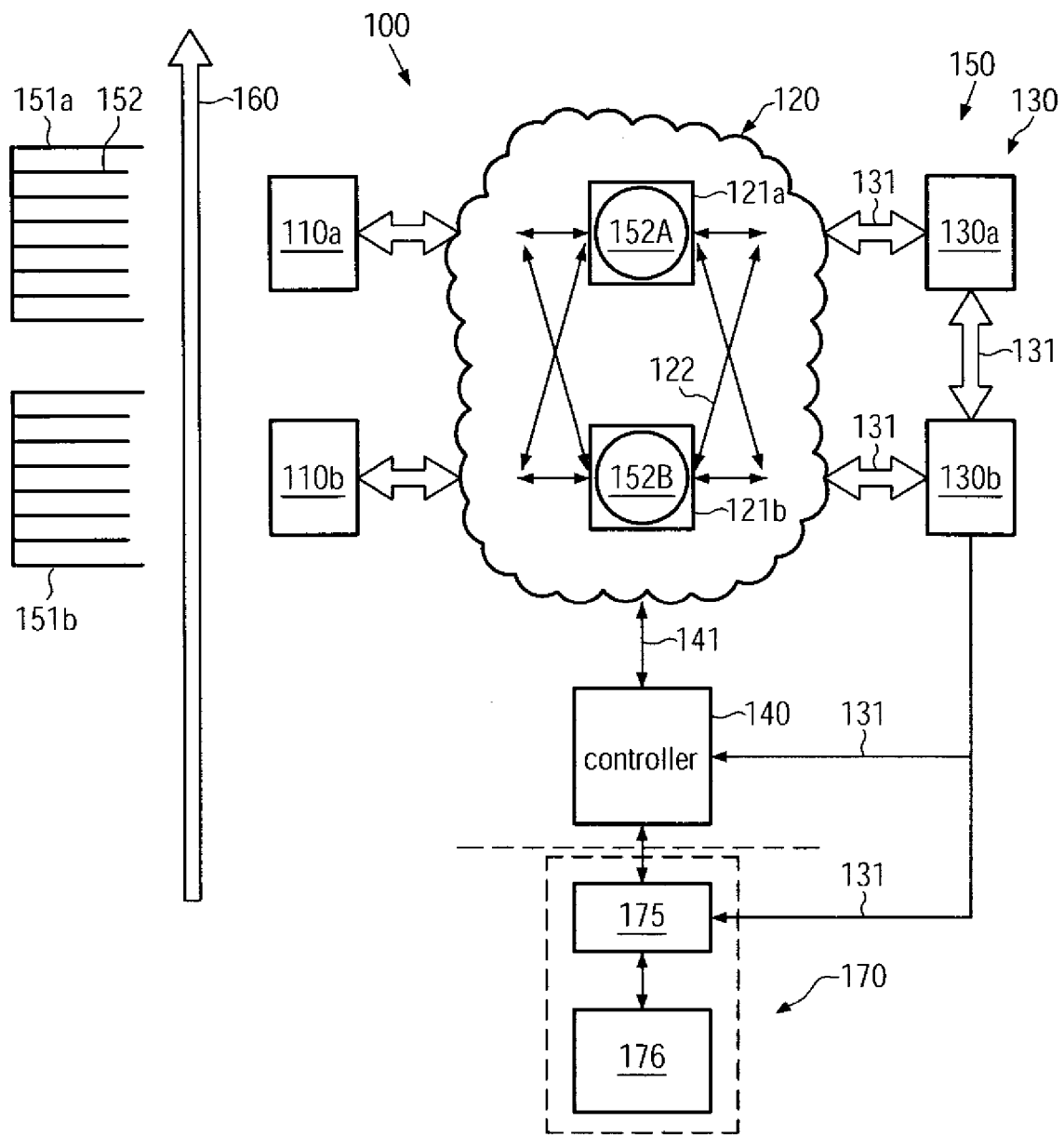
FIG. 1a schematically illustrates a manufacturing environment including a process tool, such as a cluster tool, wherein the process tool comprises a control strategy for controlling a tool internal substrate handling system on the basis of a look-ahead functionality based on the process history of previously processed substrates so as to predict the process time of a substrate currently being processed in a process tool according to illustrative embodiments.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the subject matter disclosed herein relates to the coordination of transport tasks of an automatic substrate handling system of a process tool including one or more process modules that are served by the automatic substrate handling system. In some aspects, the process tool may comprise a plurality of process modules configured to enable the processing of substrates according to a plurality of different process threads, wherein a sequence of related process steps may be performed or wherein a process recipe may be implemented concurrently in two or more process chambers. That is, in complex cluster tools, a mixture of sequential and parallel operations may be provided wherein the overall throughput may be significantly increased on the basis of the look-ahead functionality provided by the principles disclosed herein. In other cases, the process tool may represent a single-step process sequence including one or more process modules wherein the respective tool internal substrate handling system has the capability of receiving at least two substrates concurrently, thereby providing the capability of reducing any idle times of the process module. Also, in this case, the look-ahead functionality may significantly enhance the overall throughput.

According to the subject matter disclosed herein, the static nature of the look-ahead functionality of conventional systems, for instance, with respect to initiating transport activities without a reliable trigger event, such as picking up a substrate and buffering the same in the transport system, may be replaced by a dynamic adaptation of the substrate sequencing on the basis of process history. The tool events of previously processed substrates may be taken into consideration in order to predict or estimate the process time of one or more substrates currently being processed in the process modules, when the corresponding process recipes may be inappropriate for extracting a reliable start time for respective transport activities. That is, according to the principles disclosed herein, the process history, at least for a desired time horizon, may be determined in order to obtain an expected process time, which may then be used for initiating transport activities, such as picking up a substrate from the one or more load ports and buffering the substrate within the transport system to enhance the availability of the substrate when a respective reliable trigger event indicates completion of processing of a substrate. Thus, based on the process history, that is, the plurality of tool events related to previously processed substrates, the selection of a specific substrate and the start point of transport activities therefor may be performed in a highly dynamic manner, thereby providing the potential for reducing idle times of the process chambers. For example, by using any appropriate analysis techniques, the process history of a process chamber may be recorded or determined and may be used for estimating the process time for a specific combination of substrate and process chamber so that the actual process time may be approximated by the expected value obtained on the basis of an automated analysis of the process history, thereby providing a significantly enhanced view of the timing of future tool events and improved quality of respective look-ahead decisions, wherein the corresponding decisions typically involve an appropriate coordination of transport activities of the tool internal substrate handling system.

For instance, deposition tools, etch tools and the like may have a highly dynamic process behavior, even for identical process recipes, wherein the determination of a predicted process time may enable a dynamic adaptation of the transport activities, for instance in combination with reliable trigger events, in order to enhance the utilization of the tool resources.

It should be appreciated that the subject matter disclosed herein may be advantageously applied to process tools, such as cluster tools, used for the fabrication of semiconductor devices, wherein the term "semiconductor device" is to be understood as a generic term for a device formed on the basis of micromechanical or microelectronic manufacturing techniques, since, here, process recipes, tools and types of products may change more frequently compared to other industrial fields.

FIG. 1a schematically illustrates a manufacturing environment 150 that, in one illustrative embodiment, represents a manufacturing environment for the fabrication of semiconductor devices which are typically formed on the basis of an appropriate carrier material, also referred to as a substrate, such as wafers and the like. The manufacturing environment may comprise one or more process tools, such as a process tool 100, which may comprise one or more load ports 110a, 110b that are configured to receive and/or discharge substrate carriers 151a, 151b which may typically contain a certain number of substrates 152. The number of substrates 152 may vary depending on the overall process strategy. For example, one or more of the substrate carriers 151a, 151b may be empty, where additional substrate carriers may be required in the process tool 100, while, in other cases, a standard lot size may be contained in the carriers 151a, 151b, while also lots of very different sizes may be present at the tool 100. The substrate carriers 151a, 151b may be conveyed within the manufacturing environment 150 on the basis of an automated material handling system (AMHS) 160 and/or by any other means, such as operators and the like. The one or more load ports 110a, 110b may therefore be considered as an interface for obtaining the carriers 151a, 151b from the transport system 160 and for dispatching substrates processed by the tool 100 into other areas of the manufacturing environment 150 via the system 160. It should be appreciated that the load ports 110a, 110b may have any appropriate configuration for receiving any specific type of carriers 151a, 151b, such as FOUP (front opening unified pods) and the like, wherein load ports 110a, 110b, or at least some of the ports, may provide a controlled ambient to reduce contamination of the substrates 152 during exchange of carriers and during transporting of the substrates 152 within the process tool 100.

The process tool 100 may further comprise one or more process modules or process chambers 130 wherein, in some illustrative embodiments, the process chambers 130 may represent equivalent process modules designed to perform substantially the same processes, thereby providing a high degree of parallelism for the process under consideration. In other cases, the one or more process modules 130 may represent a sequence of process modules performing different process steps. In still other illustrative embodiments, the one or more process modules 130 may represent a mixture of sequential and parallel process modules, i.e., some of the modules may perform the same process, while other modules may perform different processes within a sequence of process steps required for obtaining the desired process result of the tool 100. For example, the various possibilities are represented by the arrows 131, thereby indicating that the tool 100 is to represent a tool capable of a parallel mode, a sequential mode, a mixture mode or even a single-step mode. Thus, it should be appreciated that the process modules 130 may represent a single process module or three or more process modules and the process modules 130a, 130b are of illustrative nature only. For instance, the process tool 100 may represent a deposition tool for a process sequence for depositing different layers, possibly including any cleaning steps, or the tool 100 may represent a single deposition tool having, for instance, an alternate mode of operation, i.e., operating a process module alternatingly with substrate and without substrate and the like. In other cases, the tool 100 may represent a chemical mechanical polishing (CMP) tool for a process sequence requiring the polishing of different materials in subsequent process steps, possibly including rinsing and drying steps and the like. In other cases, the tool 100 may represent an etch tool for performing one or more etch steps.

The process tool 100 may further comprise an automatic substrate handling system 120, which may be provided in some illustrative embodiments as a robot system configured to access the one or more load ports 110*a*, 110*b* and the one or more process modules 130 so as to appropriately deliver substrates 152 to be processed within the tool 100 to a desired one of the process modules 130. It should be appreciated that the automatic substrate handling system 120 may actually represent a complex mechanical and electronic system wherein the overall configuration depends on the complexity of the tool 100. Typically, due to the high complexity of the substrate handling system 120 and due to the fact that usually processes in the one or more process modules 130 may involve significantly longer process times compared to a single transport activity of the system 120, the system 120 may perform a single transport task or activity at a time. In other illustrative embodiments, the system 120 may perform more than one transport activity at a time while, nevertheless, for a typical process situation, the number of transport requests dispatched by the various process modules 130 may typically exceed the number of transport activities that may concurrently be performed by the system 120. Consequently, the substrate handling system 120 may comprise respective internal controller units configured to operate the system 120, that is, to coordinate or initiate the transport activities of the system 120 on the basis of a predefined supervising control strategy. That is, the system 120 is configured to receive respective requests for transport activities related to one or more process modules 130 and may serve the respective requests on the basis of a specific algorithm in order to obtain a desired overall behavior of the tool 100, for instance with respect to throughput, distributing of substrates to the process modules 130 and the like.

In one illustrative embodiment, the substrate handling system 120 comprises at least a first transport device 121*a* and a second transport device 121*b*, both of which may be configured to receive a substrate 152 from the one or more load ports 110*a*, 110*b* and to deliver a respective substrate to the one or more process modules 130. For example, the first and second transport devices 121*a*, 121*b* may be provided in the form of a robot handler having at least two substrate blades for receiving and delivering a substrate. The respective transport capability is represented by the arrows 122, wherein the corresponding hardware and software components of the system 120 may be provided in the form of conventionally available components.

In one illustrative embodiment, the process tool may comprise a controller 140 that is operatively connected to the substrate handling system 120, wherein the controller 140 may be configured to instruct any system internal control components of the system 120 to operate on the basis of a control strategy supplied by the controller 140 via respective information or messages 141. It should be appreciated that the messages 141 represent any appropriate form of signals having encoded therein information for causing the system 120 to perform one or more transport activities in accordance with the control strategy implemented in the controller 140. Moreover, in the embodiment shown, the controller 140 may also receive respective messages 141 which may also be referred to as tool event messages, which indicate at least tool-specific events. For example, the messages 141 received by the controller 140 may be associated with tool-specific events generated during transport activities of the system 120. For example, a transport-related tool event may represent the positioning of a substrate 152 on one of the transport devices 121*a*, 121*b* or the delivering of one of the substrates to a load or unload position of the one or more process modules 130*a*, 130*b* and the like.

Moreover, in some cases, the controller 140 may have implemented therein a look-ahead functionality, for instance in the form of a specific rule that may be invoked upon the occurrence of a specific trigger event obtained from any tool internal components. For instance, as previously explained, the controller 140 may also receive event messages 131 from the one or more process modules 130, which may represent a reliable indication for a remaining process time in the respective process module 130. For example, the movement of substrate pins, typically used for supporting a substrate 152 within the one or more process modules 130, may be a clear indication for the imminent end of the processing in the module 130. That is, the processing of the respective substrate 152 will be finished within several seconds. Consequently, upon detection of the event message indicating such a reliable prediction of the end of the process, the controller 140 may initiate a transport activity, for instance, by moving one of the transport devices 121*a*, 121*b* that is not occupied by a substrate to the one or more process modules 130 having released the relevant event message 131. In this case, undue idle times of the respective process module 130 for unloading the substrate that is currently being processed may be avoided or at least be significantly reduced.

However, as previously explained, a next substrate has to be supplied to the process module 130 under consideration to also maintain the idle time caused by loading a new substrate at a moderately low level. For this purpose, in one illustrative embodiment, the process tool 100 comprises a tool internal transport control system 170 that is operatively connected to the controller 140. The tool internal transport control system 170 may be configured to predict or estimate a process time or a related parameter for a substrate that is currently being processed in the one or more process modules 130 on the basis of event messages 141 and/or 131 obtained from one or more substrates previously processed in the one or more process modules 130. Thus, in this case, the transport control system 170 may be connected within the tool 100 so as to receive at least the tool messages 141 and/or 131 from the controller 140 or directly from the respective tool internal components, as is for instance indicated for the event messages 131. Based on tool event messages of previously processed substrates, the system 170 may be configured to determine an estimated process time of currently being processed substrates and may therefore be capable of determining appropriate start times for initiating appropriate transport activities for exchanging substrates between the one or more load ports 110*a*, 110*b* and the one or more process modules 130. In some illustrative embodiments, the tool event messages 141, 131 received by the control system 170 may be processed within the system 170 according to different categories, as will be described later on in more detail, wherein a predicted value for the process time under consideration may be estimated on the basis of one or more categories, wherein each category may represent a specific type of tool event, possibly in combination with a separation into different process threads within the tool 100. Consequently, the degree of accuracy of the prediction may be enhanced by using process information that relates to very similar process situations.

In one illustrative embodiment, the control system 170 may comprise an interface 175 that is configured to receive the tool event messages 141, 131 and also communicate with the controller 140. When the system 170 represents a tool internal component of the process tool 100, the controller 140 and the system 170 may be provided in the form of any appropriate hardware configuration or may be implemented therein, while in other illustrative embodiments, the control system 170 may be provided as an external component wherein the interface 175 provides connectivity to the process tool 100, i.e., the controller 140 and any other resources designed to provide event messages, such as the messages 141, 131. Moreover, the control system 170 may comprise a process time prediction unit 176 that is operatively connected to the interface 175 to receive the tool event messages 141, 131 in any appropriate format and also supply to the interface 175 an appropriate control signal for initiating transport activities of the system 120 via the controller 140. For example, the prediction unit 176 may provide a predicted value for the end of processing of substrates within the process modules 130a, 130b from which an appropriate start time for a transport activity may be generated causing one of the transport devices 121a, 121b to receive a substrate 152 from an appropriate one of the load ports 110a, 110b, while the other one of the transport devices 121a, 121b may be available for responding to a reliable trigger event, such as the movement of substrate pins, as previously discussed. Since the corresponding prediction of the process times may be based on a plurality of previously obtained process information, a moderately high degree of accuracy may be obtained, thereby enabling a dynamic response of the transport system 120 to the overall situation of the tool 100, which may result in enhanced overall throughput of the tool 100.

During operation of the process tool 100, the substrate carriers 151a, 151b may be exchanged with the one or more load ports 110a, 110b via the transport system 160, as previously explained. It should be appreciated that typically the carrier exchange capability of the tool 100 may be adapted to the mean carrier exchange time that is substantially defined by the capabilities of the transport system 160. Thus, for a substantially continuous operation of the tool 100, an appropriate number of load ports may typically be provided to ensure the continuous presence of substrates to be processed. It may be assumed that a first one of the substrates 152 is currently being processed in the module 130a, while a second one of the substrates 152 is currently being processed in the module 130b. When the operational mode is a parallel mode, that is, both modules 130a, 130b may perform substantially the same process based on the same process recipe wherein, however, the actual process times or productive times of the modules 130a, 130b may differ due to module-specific and substrate-specific variations, the modules may launch respective requests for transport activities for substrate exchange in a highly dynamic and different manner. However, as previously explained, the principles disclosed herein may also apply to a single module or more than two modules in the tool 100 depending on the type of process tool used. The substrates in the process modules 130a, 130b may be supplied by the transport system 120, thereby creating a sequence of tool event messages 141 related to transport activities. Similarly, during the processing, a sequence of event messages may be produced by each of the process modules 130. The event messages 141, 131 may finally be received by the prediction unit 176, for instance via the interface 175, and may be used for determining a process history and thus a predicted value for the process time of substrates 152 that may have to be processed in the modules 130 after completing the processing of the current substrate 152. Similarly, the respective event messages 141, 131 obtained from previously processed substrates may be used by the prediction unit 176 to estimate the process time of the modules 130a, 130b for the currently being processed substrates.

For this purpose, one or more appropriate types of event messages may be analyzed, for instance on the basis of using mean values, data fitting or any other appropriate techniques, to determine, for instance, respective predicted values for the modules 130a, 130b. For convenience, it may be assumed that the substrate in the module 130a may be completed earlier, so that an appropriate start time for a transport activity may be established to load an appropriate substrate 152 into the tool internal transport system 120, thereby having the respective substrate available for supplying it to a load position of the module 130a. On the other hand, respective resources in the system 120 may be reserved to await the actual end of the process in module 130a, wherein a respective reliable trigger event, such as the movement of substrate pins, may be used in order to initiate the respective transport activity in advance upon identifying the event message 131 indicating this trigger event, as previously explained.

For example, the first transport device 121a may have received a first substrate 152A dedicated for the module 130a after completion of the processing of the substrate positioned therein. The respective transport activity for receiving the substrate 152A may be selected on the basis of the predicted process time provided by the unit 176, wherein the unit 176 and/or the controller 140 may further determine the corresponding start time for the respective transport activity on the basis of other criteria, such as priority of substrates and the like. Thus, based on an appropriate strategy, the substrate 152A has been selected as the next substrate to be processed in the module 130a wherein the respective transport activity is initiated so as to not unduly waste transport resources of the system 120 while nevertheless ensuring a minimum waiting time for delivering the substrate 152A to the module 130a. Thus, upon detection of an appropriate trigger event, the controller 140 may initiate a transport activity, for instance of the second transport device 121b, to await the substrate 152 currently being processed in the module 130a. Consequently, upon actually completing the processing of the substrate, it may immediately be received by the device 121b, as indicated by a substrate 152B, and may be supplied to an appropriate load port 110a, 110b. Depending on the configuration of the system 120, the substrate 152A may be concurrently or subsequently supplied to the load position of the module 130a, thereby significantly reducing the idle time of this module. Thereafter, an appropriate transport sequence may be established for the module 130b in order to also reduce its idle time caused by substrate exchange.

In one illustrative embodiment, a predefined type of event messages 141, 131 may be used in establishing a predicted value for the process time of the modules 130. In some cases, any event message 131 may be used that is correlated with the actual start of the process in the modules 130 and any appropriate event message 131, 141 may be used that is correlated with the actual end of the respective process. Hence, by using respective event messages, at least for a certain time horizon, an expected process time may be calculated and may be used in combination with knowledge with respect to the hardware specific timing of the transport activities within the system 120 in order to predict an appropriate start time for offering an appropriate substrate within the system 120, as previously explained. Consequently, the sequencing of substrates via the transport system 120 into respective process modules 130 may be coordinated with a high degree of flexibility and in a highly dynamic manner while nevertheless providing a high overall throughput of the process tool 100.

Figure 1B:
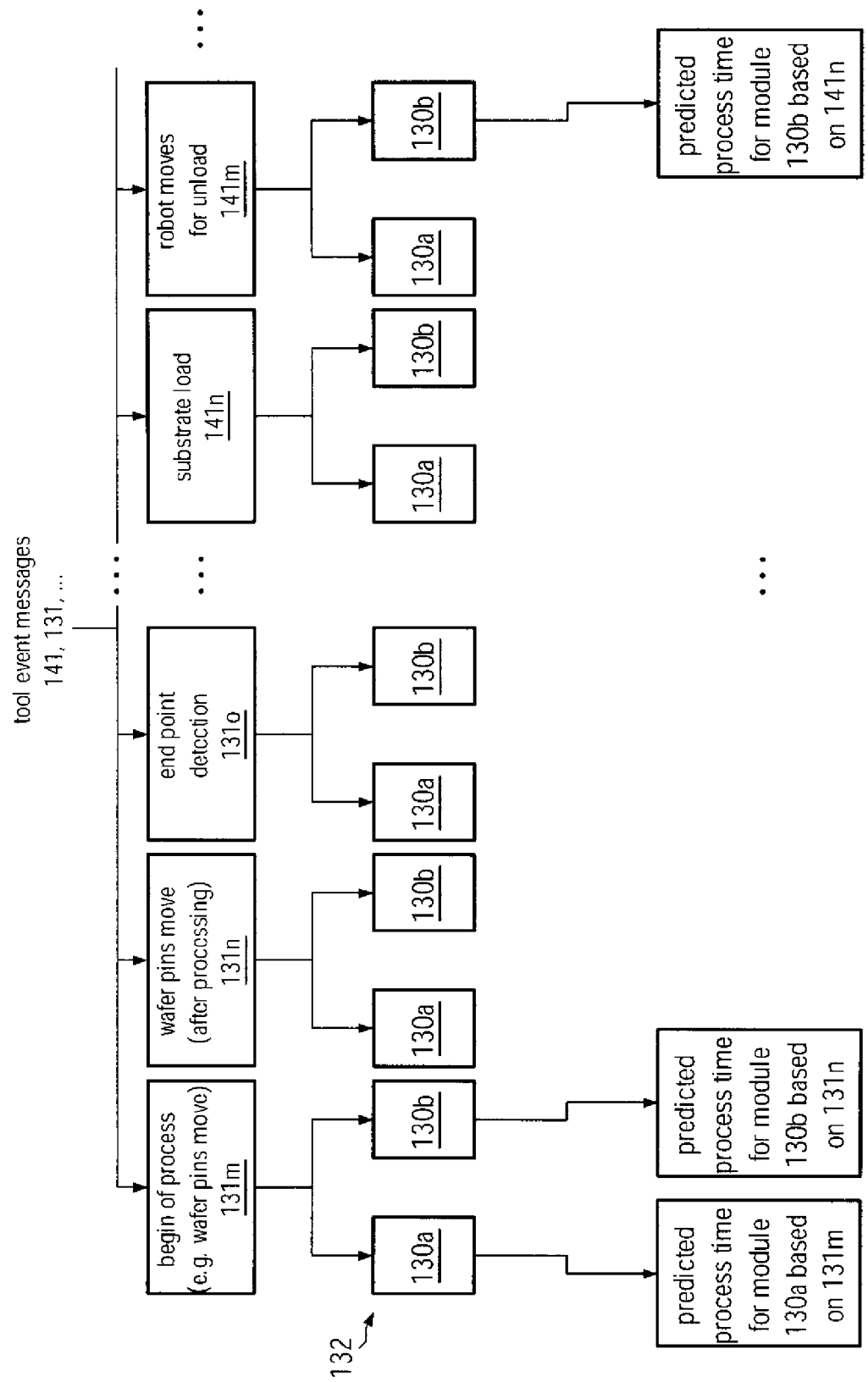
FIG. 1b schematically illustrates a scheme for classifying process events so as to enhance the look-ahead functionality of a transport system according to illustrative embodiments.

FIG. 1b schematically illustrates a control strategy implemented in the process time prediction unit 176 according to illustrative embodiments. Tool event messages 141, 131, which may be related to the transport system 120 and process modules 130, may be received by the unit 176, for instance via the interface 175, wherein it should be appreciated that, in other cases, only one branch of event messages 141, 131 may be used, or even more branches may be used, for instance event messages may be received by the unit 176 that relate to the load ports 110a, 110b, thereby enabling the possibility to also take into consideration the status of the respective load ports and/or of the substrate carriers 151a, 151b, for instance, with respect to the lot size and the like. In the embodiment shown, the event messages 141, 131 may be divided into several types of events, wherein one or more types of events may be used by the unit 176 for estimating a predicted process time, while other types of event messages may be discarded. As shown, a first type of event messages related to process modules 130, indicated as 131m, may represent the beginning of an actual process in the modules 130. For instance, a corresponding movement of wafer pins for positioning the substrate in the process chamber may represent the beginning of the processing. Similarly, a second type of module-related event messages, indicated as 131n, may represent the movement of the wafer pins after processing, which typically happens several seconds prior to positioning the substrate at the substrate unload position of a respective one of the modules 130. In other cases, the event messages may relate to events at a "higher level," such as endpoint detection results and the like. It should be appreciated that, depending on the various processes realized in the modules 130, any other process-related event messages may be used.

As an example for transport-related event messages 141, a substrate load event, indicated as 141n, may be used which may also be correlated to the actual beginning of the processing of a substrate. Similarly, an event message 141m may represent a transport activity for positioning a transport device at an unload position of a process module, for instance caused by a reliable trigger event, which may therefore be correlated with the actual end of the processing in one of the modules 130. Hence, each of these different types of event messages obtained from previously processed substrates, thereby indicating the process history of the modules for specific substrates, may be used, individually or in combination, in order to determine a probable process time for a currently being processed substrate.

Furthermore, in some illustrative embodiments, the substantially equivalent event messages corresponding to the respective types 131m . . . 141m may further be divided by the unit 176 to provide increased "sensitivity" with respect to process threads within the tool 110. That is, the event messages belonging to a certain type may further be divided according to specific criteria, such as substrate-specific characteristics or module-specific characteristics. For instance, in one illustrative embodiment, the messages of each type may be associated with the respective process modules 130a, 130b, thereby taking into consideration module-specific characteristics. However, additionally or alternatively, other criteria may be used, such as previous process steps, for instance, in the same tool 100 and the like, to more finely resolve the history of a combination of substrates and process modules. From the corresponding categorization 132 of event messages, appropriate predicted process times for the modules 130 may be determined. That is, from the event messages 131m related to the module 130a, an appropriate predicted process time may be established for the module 130a. Similarly, based on the event messages 131m, an appropriate predicted process time may be obtained for the module 130b. Each of the predicted process times may be used for obtaining an appropriate start time for buffering a substrate within the transport system 120, wherein it should be appreciated that a single predicted process time may be used in some illustrative embodiments, while, in other cases, two or more of the predicted process time may be combined in any appropriate way to further enhance the accuracy of a corresponding "mean" predicted process time that may be based on a large number of event messages. For example, in some cases, a plurality of the predicted process times related to the module 130a and based on messages 131m . . . 141m may be combined to obtain a "mean" predicted process time.

It should be appreciated that the event messages 141, 131 may be stored in any appropriate format in the unit 176, or appropriate information may be obtained from the event message in a substantial real-time manner without requiring a high data storage capacity, while nevertheless providing the potential of representing the history of the associated event messages. For example, in one illustrative embodiment, an expected process time may be determined on the basis of an exponentially weighted moving average (EWMA) wherein the predicted time for a next substrate of one or more of the process modules 130 may be calculated on the basis of a current "measurement" value, i.e., of a current event message of a currently being processed substrate, and the previously determined predicted process time used for the currently being processed substrate, wherein these two components are appropriately weighted in accordance with well-established techniques. Thus, in this way, the overall history of the event messages may be encoded into a newly calculated predicted process time, wherein the most recent "measurement results," i.e., actual event messages, may provide continuous updating of the historical behavior. Consequently, the required storage capacity for receiving and storing the tool event messages 141, 131 may be kept at a low level. It should be appreciated, however, that any other appropriate techniques may be used, for instance averaging the process times associated with the respective event messages for a desired time horizon and using the respective times for determining a predicted process time for the module under consideration.

Again referring to FIG. 1b, event-based predicted process times may be calculated by, for instance, using a point in time of an event 141m associated with a substrate A and combining the corresponding point in time with the point in time associated with an event 141n for the same substrate. For instance, since it may be assumed that the events 141m are highly correlated with the actual end of a process for the substrate under consideration, while the events 141n are highly correlated with the actual beginning of the process, the difference of these time points provide a representation of an actual process time of a previously processed substrate. Respective process times may be obtained for a plurality of substrates and may then be statistically evaluated on the basis of any appropriate means, such as the above-identified exponentially weighted moving average, an average taken over a specified time horizon and the like. In other cases, process times of previously processed substrates may be based on event messages related to the modules 130 only, for instance, by using the time points of events 13 in, correlated to the end of the processing, and time points associated with events 131m, correlated with the actual beginning of the processing, wherein a further time period, which may be assumed as a constant time, may be used to take into consideration the time required for actually loading the substrate into the module prior to moving the respective wafer pins and removing the substrate from the module after moving the wafer pins, which is not included in the process times 131*m*, 131*n*. In other cases, a "mixed" process time may be obtained on the basis of events 131*n* and events 141*n*, possibly in combination with an appropriate offset value to take into consideration additional process times within the respective process module.

As a result, the subject matter disclosed herein provides an enhanced control strategy and an enhanced control system for coordinating the transport activity in a tool internal substrate handling system by implementing an enhanced look-ahead functionality. The look-ahead functionality is obtained on the basis of tool-specific events obtained for previously processed substrates, thereby enabling the prediction of the process time of modules for substrates that are currently being processed. Consequently, since the process times may be predicted on the basis of statistically relevant data, a high degree of reliability may be obtained for the process time prediction, thereby enabling the initiation of appropriate transport activities, for instance the buffering of a substrate that is to be processed as the next substrate, which may therefore allow significantly reducing any idle times in the process modules. The look-ahead functionality accomplished on the basis of tool events associated with previously processed substrates may be advantageously combined with a look-ahead functionality achieved by reliable trigger events, thereby providing enhanced flexibility and reliability in establishing an appropriate substrate sequencing within a process tool. Consequently, the non-productive times of the process modules may be reduced. For instance, a significant improvement of up to 15% in throughput may be observed for PVD and CVD tools that are operated in parallel lot mode with a capacity of two process modules per tool. Also, in other complex process tools, such as complex cluster tools, a significant improvement of the overall throughput may be obtained, depending on the transport capacity of the tool internal system and the number of process threads within the tool. For example, in a typical process tool assigned for processing substrates of 300 mm, the tool internal transport system is typically provided with a dual blade robot handler that provides a required capacity of buffering a substrate while enabling an additional substrate transport activity. Consequently, in sophisticated manufacturing environments, a significant improvement of the substrate sequencing within a wide class of process tools, for instance tools having at least two process steps or having an alternating process regime with and without a substrate or process tools operating in a parallel lot mode may be enhanced. Due to the enhanced look-ahead functionality, transport-related decisions may be made in a dynamic manner, since, for instance, the available transport resources may be utilized more efficiently, for instance, when deciding whether or not to perform a transport while certain modules are expected to complete operation within the near future.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A process tool configured to process substrates, the process tool comprising:
   one or more process modules;
   one or more load ports configured to receive and discharge substrate carriers containing substrates;
   a substrate handling system configured to exchange substrates between said one or more load ports and said one or more process modules;
   a process time prediction unit configured to receive tool event messages from at least one of said one or more process modules and said substrate handling system and to predict a current process time for said one or more process modules on the basis of an event history that represents tool event messages received with respect to one or more previously processed substrates, wherein said process time prediction unit is configured to establish an event history for a predetermined type of tool events on the basis of said tool event messages; and
   a control unit operatively connected to said substrate handling system and said process time prediction unit, said control unit being configured to initiate a substrate handling activity by said substrate handling system on the basis of said predicted current process time.

2. The process tool of claim 1, wherein said substrate handling system comprises a first substrate transport device and a second substrate transport device to concurrently process a first substrate and a second substrate.

3. The process tool of claim 1, wherein said predetermined type of tool events represents tool events associated with said one or more process modules.

4. The process tool of claim 2, wherein said process time prediction unit is further configured to determine a start time of a substrate unload operation for receiving a substrate by one of said first and second substrate transport devices at said one or more process modules on the basis of a received tool event message related to substrate currently being processed in said one or more process modules.

5. A transport control system, comprising:
   an interface configured to receive tool event messages from a controller operatively connected to a substrate handling system of a process tool comprising one or more process modules served by said substrate handling system; and
   a process time prediction unit operatively connected to said interface and configured to predict a current processing time in response to a first type of tool event message and on the basis of an event history of the first type of tool event messages related to one or more substrates previously processed in said process tool, and wherein the process time prediction unit is also configured to use the predicted current processing time to determine a start time for picking up, by said substrate handling system, a substrate to be supplied to said one or more process modules, wherein said process time prediction unit comprises an analyzing unit that is configured to determine a statistical value for the first type of tool event message on the basis of the event history and to determine said start time by using said statistical value.

6. A method, comprising:
   receiving at least one tool event message from a process tool used in a manufacturing environment designed to process microstructure devices, said process tool comprising one or more process modules, one or more load ports for receiving and discharging substrate carriers and a substrate handling system for exchanging substrates between said one or more load ports and said one or more process modules;

predicting a current processing time associated with said process tool in response to receiving said at least one tool event message, and wherein the current processing time is predicted based on an event history of tool event messages related to one or more substrates previously processed in said one or more process modules;

determining a first start time for receiving a first substrate to be conveyed to said one or more process modules by said substrate handling system on the basis of the predicted current processing time; and picking up said first substrate by said substrate handling system on the basis of said first start time.

7. The method of claim 6, wherein predicting the current processing time comprises estimating a remaining process time of a second substrate currently being processed in said one or more process modules by using the event history.

8. The method of claim 7, further comprising determining a second start time for receiving said second substrate from said one or more process modules by said substrate, handling system on the basis of a tool event message related to said second substrate.

9. The method of claim 8, wherein said second start time is determined while said first substrate is buffered in said substrate handling system.

10. The method of claim 6, wherein determining said first start time comprises selecting a type of tool event and using a plurality of tool events related to previously processed substrates and belonging to said type.

11. The method of claim 10, wherein said type of tool events represents a specific type of transport activities of said substrate handling system.

12. The method of claim 10, wherein said type of tool events represents a specific type of activities of said one or more process modules.

13. A method, comprising:

receiving at least one tool event message from a process tool used in a manufacturing environment designed to process microstructure devices, said process tool comprising one or more process modules, one or more load ports for receiving and discharging substrate carriers and a substrate handling system for exchanging substrates between said one or more load ports and said one or more process modules;

determining, in response to receiving said at least one tool event message, a first start time for receiving a first substrate to be conveyed to said one or more process modules by said substrate handling system on the basis of said at least one tool event message and an event history of tool event messages related to one or more substrates previously processed in said one or more process modules, wherein said process tool comprises a first process module and a second process module and wherein said first start time is determined on the basis of tool event messages related to only one of the first process module and the second process module; and picking up said first substrate by said substrate handling system on the basis of said first start time.

14. The method of claim 13, further comprising determining a first remaining process time of said first process module and a second remaining process time of said second process module on the basis of said tool event messages and determining said first start time on the basis of said first and second remaining process times.

15. The method of claim 14, wherein said first start time is determined on the basis of the shorter one of said first and second remaining process times and said first substrate is dedicated for one of the first and second process modules having the shorter one of said first and second remaining process times.

\* \* \* \* \*